H. L. ZABRISKIE & G. C. MARX.
COMMUTATOR AND COMMUTATOR BAR.
APPLICATION FILED APR. 3, 1916.
1,271,984. Patented July 9, 1918.
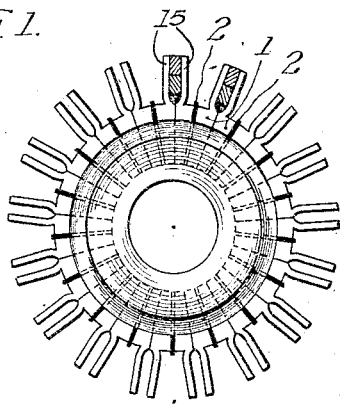
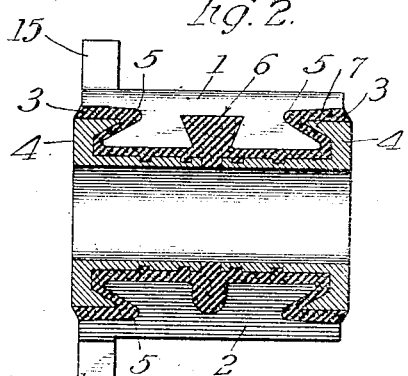
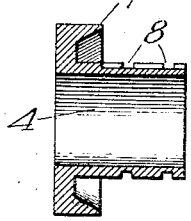
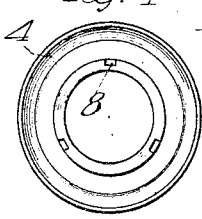
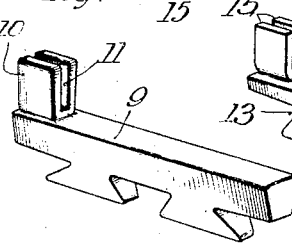
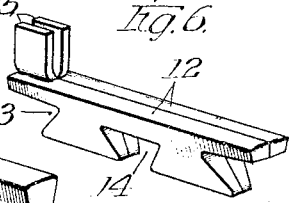
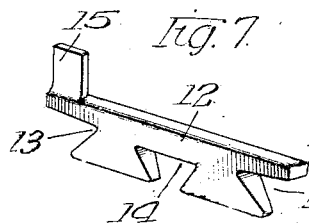
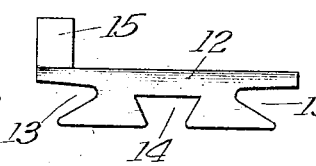
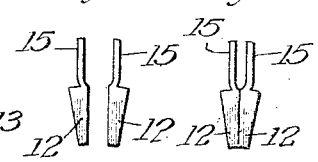
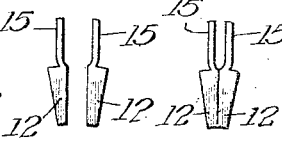
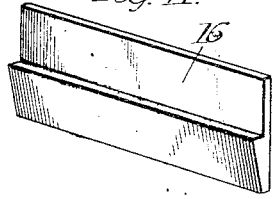
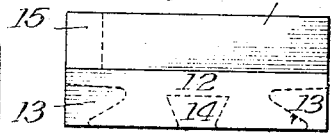
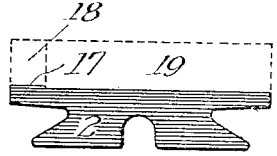
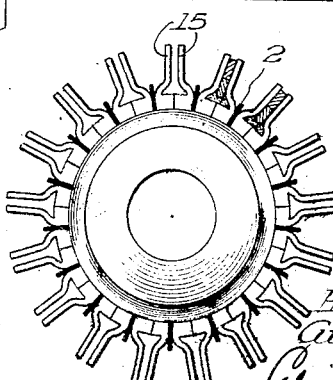
Witnesses
Inventors
Henry L. Zabriskie
Gustave C. Marx
Edwin B. H. Tower Jr. Atty.

UNITED STATES PATENT OFFICE.

HENRY L. ZABRISKIE, OF WESTFIELD, AND GUSTAVE C. MARX, OF ELIZABETH, NEW JERSEY, ASSIGNORS TO DIEHL MANUFACTURING COMPANY, OF ELIZABETH, NEW JERSEY, A CORPORATION OF NEW JERSEY.

COMMUTATOR AND COMMUTATOR-BAR.

1,271,984.

Specification of Letters Patent.

Patented July 9, 1918.

Application filed April 3, 1916. Serial No. 88,712.

*To all whom it may concern:*

Be it known that we, HENRY L. ZABRISKIE and GUSTAVE C. MARX, citizens of the United States, residing, respectively, at Westfield and at Elizabeth, both in the county of Union, State of New Jersey, have invented new and useful Improvements in Commutators and Commutator-Bars, of which the following is a specification.

This invention relates to commutators and commutator bars.

Commutators for dynamo electric machines generally comprise a plurality of conducting bars, which are arranged in the form of a cylinder, and insulated from each other to form a cylindrical shell composed of alternate sections of conducting and insulating material. Each of the bars is usually provided with an upstanding projection or lug which has a slot therein to receive the end of the armature conductor that is to be attached to the bar. These bars are forged or cut to the desired shape and the slots are cut in the projections by a milling machine or the like. The slot-cutting operation requires considerable time and labor and adds to the cost of manufacture.

It is important that a commutator bar structure be provided which can be readily and economically manufactured so that an efficient commutator can be inexpensively produced.

One of the objects of the present invention is to provide an improved commutator bar.

Another object is to provide a commutator bar which requires a minimum number of operations for its manufacture.

Another object is to provide a commutator bar which can be manufactured with a minimum waste of material.

Another object is to provide an improved commutator bar which will reduce to a minimum the amount of insulation required between the bars when they are assembled into a commutator.

Another object is to provide an improved method of making a commutator bar.

A further object is to provide an improved commutator construction.

Other objects and advantages of the invention will hereinafter appear.

The accompanying drawings illustrate an embodiment of the invention.

The views of the drawings are as follows:

Figure 1 is an end view of commutator showing the armature conductors attached to the bars.

Fig. 2 is a longitudinal cross section of the commutator shown in Fig. 1.

Figs. 3 and 4 are cross-section and end views respectively of the sleeves forming a part of the commutator.

Fig. 5 is a perspective view of an old-style commutator bar.

Fig. 6 is a perspective view of an improved commutator bar.

Fig. 7 is a perspective view of one of the parts of the commutator bar shown in Fig. 6.

Fig. 8 is a side elevation of the commutator bar element shown in Fig. 7.

Fig. 9 is an end view of the two parts making up the bar shown in Fig. 6 before said parts are assembled.

Fig. 10 is an end view similar to Fig. 8 showing the parts in assembled position.

Fig. 11 is a perspective view of a blank out of which the parts making up the improved commutator bar may be stamped.

Fig. 12 is a side view of the blank shown in Fig. 11.

Fig. 13 is a side view of a strip of mica insulation which may be used between the bars.

Fig. 14 is an end view of a commutator showing an alternative construction of commutator bar.

The commutator construction shown in Figs. 1 to 4, inclusive, will first be explained, after which an improved construction of bar for use in a commutator of this type will be described.

The commutator comprises, in general, a plurality of conducting bars 1 arranged in the form of a cylinder and insulated from each other by strips of insulation 2, a body of insulating material 3, and bushings 4 embedded in the insulating material at the ends of the cylinder.

The commutator bars are composed of copper or the like and are shown as made in two parts but, for the purpose of describing the commutator, the bar will be considered as a unit indicated by the reference numeral 1.

Each complete bar has a projection at one end thereof, generally called a "riser" to which the conductors of the dynamo armature are connected. The inner edge of each bar is provided with end notches 5 and a central notch 6 shaped so as to leave dove tail projections on the inner edge of the bar. When the bars are assembled into the form of a cylinder, the end notches form annular recesses in the ends of the cylinder and the central notches form a central annular recess.

The inner edges of the bar are surrounded by the insulating material 3 which fills the recesses and forms, in effect, an insulating hub.

Bakelite has been found suitable for this purpose. It may be obtained in the form of a coarse powder. Bakelite is an insulating material made of phenolic condensation products. It has the property of hardening under heat and pressure into a solid body and, after hardening, is not susceptible to heat. Furthermore, it does not contract when cooled, and accordingly the commutator bars do not become loose when the commutator is subjected to heating and cooling stresses in service. Other insulating materials which meet the requirements may also be used.

The bushings 4 illustrated more particularly in Figs. 3 and 4 are embedded in the insulating material at the ends of the commutator as shown in Fig. 2. These bushings have annular ribs 7 complementary to the annular recesses formed by the end notches 5 in the commutator bars. They also have circumferential recesses 8 which are filled with ribs of insulating material when the commutator is assembled, said ribs being integral with the main body of insulation 3 and thereby interlocking the insulation and the bushings. The bushings reinforce and protect the insulation and assist in holding the bars in position as well as forming metal hubs for the commutator.

The method of making the commutator is as follows:

The bars are assembled in the form of a cylinder with insulating material between them and they are held rigidly in position by means of a steel ring. The assembled unit is then placed in a mold and insulating material in plastic or powder form is packed in the notches and around the inner edges of the bars.

The bushings 4 are embedded in the insulating material and held in alinement by means of a suitable rod which passes through the openings in them. The mold is then placed in a steam heated press and pressure is exerted on the bushings to force them into proper position and at the same time compact the insulating material and force it into the various notches and recesses as the heat of the press brings said material to a fluid or plastic condition.

The commutator is baked for a sufficient period, after which it is removed from the mold and from the steel ring and turned in a suitable machine to a finished size.

The commutator thus formed is adapted to be used with a dynamo by mounting the commutator on the shaft of the dynamo armature and connecting the armature conductors to the projections or risers on the commutator bars.

It is to be understood that various forms of commutator bars may be used in the commutator above described. Various insulating materials may also be used and bakelite may be employed instead of mica to insulate the commutator bars from each other. The shape of the bushings and of the bars may be varied to meet different requirements.

A commutator bar such as heretofore generally used to make commutators is shown in Fig. 5. It comprises a body 9 having end and central notches in the inner edge thereof and an integral projection or riser 10 having a slot 11 cut therein for receiving the armature conductors.

When a bar of this type is made by a forging process, considerable work is required to properly shape the bar and it is necessary to cut the slot 11 by means of a milling machine or the like.

If the bar is made by drawing a copper rod to a cross section corresponding to the body of the bar and the riser and thereafter cutting away certain parts, a large proportion of the material has to be scrapped because the part that has to be cut away to provide the riser is quite thick and comparatively large. In addition, the slot 11 must be cut in by a milling machine.

If the bar is formed by drawing copper to a cross section corresponding to the main body of the bar without a riser, it is thereafter necessary to cut slots in the bar and insert thin strips of copper to form the riser.

All of these constructions are relatively complicated and expensive.

In accordance with the present invention, a commutator bar is formed in two complementary parts which coöperate to form a complete bar having the required shape. These parts may be cut from a single blank strip with a minimum waste of material.

The improved bar is illustrated in Fig. 6 and one of the parts or elements composing it is shown in Fig. 7.

This element comprises a body 12 having end notches 13, a central notch 14, and a projection 15 at one end thereof. The complementary element is similar in shape and cross-section as illustrated in Fig. 6 where the two elements are shown assembled to form a complete commutator bar.

The commutator bar parts are formed as follows:

A copper bar is passed through dies and cold or hard drawn into a strip having a cross section corresponding to half the cross section of the commutator bar, including the projection or riser. The lower half of the strip is wedge-shaped with the widest part of the wedge at about the middle of the strip. The upper half is rectangular in cross section and comparatively thin, one side of the rectangle being in alinement with one side of the wedge. The cross section is thus bounded on one side by a straight line, on the opposite side by two straight lines joined at their inner ends by a third line, a top and bottom line connecting the outer ends of the two lines with the first-named line.

The drawn strip is cut or punched into sections forming blanks 16 illustrated in Fig. 11, having a length corresponding to the desired length of the commutator bar. The end and central notches 13 and 14 are then punched out and a portion of the upper strip of the bar is cut away as shown in dotted lines in Fig. 12, leaving a projection 15 at one end and at one side of the bar. The rectangular portion of the blank which is cut away to form the riser is relatively thin so that a comparatively small amount of metal is wasted in the process.

The blanks are stamped so as to form right and left elements, both of which are formed from the same shape of blank by leaving the projection 15 on opposite ends thereof.

When the complementary elements are assembled as shown in Fig. 6, the projections 15 are adjacent each other at one end of the bar. In order that a slot of the proper width may be provided between the projections, each is bent slightly away from the edge of the bar. This may be done very readily by a stamping operation in a press, the projection on each element being bent to proper shape before assembly.

A complete commutator bar may be quickly formed by simply assembling two complementary elements. Both of these elements are cut out of the same metal strip with a minimum waste of material. The riser to which the armature conductors are attached, is formed by the projections 15, the space between said projections automatically forming the requisite slot for the reception of the conductor.

The projections 15 being narrower than the width of the elements, and being located near the inner edge of each element, as shown in Figs. 9 and 10, or being bent inward as shown in Fig. 14, form a riser which lies over the middle of the bar. The risers of adjacent bars are consequently separated from each other. This construction further reduces the cost of the commutator without impairing its efficiency, by reducing the amount of insulation required between the commutator bars. The air space between the risers of adjacent commutator bars is sufficient to insulate them. Accordingly a mica strip 2 having a very short projection 17 may be used to insulate the bars from one another. In some cases this projection may be entirely omitted.

If the risers of adjacent bars were not separated by an air space insulation would have to be provided between them and mica strips having a relatively long projection 18 shown in dotted lines in Fig. 13 would be required. In forming the mica strip with the long projection, a relatively large quantity of mica would be wasted, this quantity being represented by the dotted line rectangle 19 in Fig. 13. A substantial saving in insulating material is thus effected by the commutator bar construction herein shown.

An alternate construction is shown in Fig. 14.

In this construction the complementary elements forming the commutator bars are formed and assembled so that the projections 15 are at the outer edges of the bars. A slot is thus provided which is wider than the conductors which are to be attached to the bars. The projections are accordingly bent inwardly as shown to engage the conductors, the small spaces at the bottom of the riser being filled with solder when the conductors are attached.

It will thus be seen that a commutator bar has been provided which may be readily made from a copper strip without requiring a milling operation to provide a slot for the attachment of the armature conductors. The cost of manufacture of the commutator bar is greatly reduced by reason of the reduction in the number of operations required for manufacture, by a reduction in the amount of metal wasted, and by a reduction in the amount of insulating material required between the bars. By the use of this construction the cost of the commutator is reduced without impairing its efficiency, and an article is provided which meets all the requirements and at the same time may be made more quickly and less expensively than the structures heretofore used.

It is to be understood that the structure shown is for the purpose of illustration only and that other structures may be devised which embody the invention and which are included within the scope of the appended claims.

What we claim and desire to secure by Letters Patent is:—

1. A commutator bar composed of two complementary metal pieces each of which has a projection extending therefrom near the inner edge thereof, said projections being adjacent to each other and being bent away from each other to provide a space in which a conductor may be inserted.

2. A commutator comprising a plurality of circumferentially arranged conducting bars insulated from each other, each of said bars being composed of two complementary metal pieces each of which has a projection thereon, said projections being adjacent to each other and coöperating to form a slot for the reception of a conductor, and the projections being formed so that the projections of adjacent bars are separated from each other.

3. A commutator comprising a plurality of circumferentially arranged conducting bars insulated from each other, each of said bars being composed of two complementary metal pieces, each of which has a projection thereon, said projections being adjacent to each other and coöperating to form a slot for the reception of a conductor, and the projections being located near the inner edges of said complementary pieces so that the projections of adjacent bars are separated from each other.

4. A commutator comprising a plurality of circumferentially arranged conducting bars insulated from each other, each of said bars being composed of two complementary metal pieces each of which has a projection thereon, said projections being adjacent to each other and so positioned and so bent as to form a slot between them for the reception of a conductor, and so that the projections of adjacent bars are separated from each other.

5. A commutator bar composed of two complementary metal pieces, each of which has a projection thereon, said projections being adjacent to each other, and each projection being substantially rectangular in cross section, said projections coöperating to form between them a slot for the reception of a conductor.

6. A commutator bar composed of two complementary metal pieces each of which has a projection thereon, said projections being adjacent to each other, and each projection being substantially rectangular in cross section, said projections being bent so as to form between them a slot for the reception of a conductor.

7. A commutator bar having a commutating surface, and comprising two complementary elements assembled side by side, each of said elements having a projection extending beyond the commutating surface and at a substantial distance within the planes of the sides of the element, said projections being in registry whereby a space is provided between said projections for a conductor.

8. The method of making a commutator bar which consists in forming two complementary elements, which, when assembled will produce a commutator bar, and providing said elements with integral projections extending beyond the commutating surface of the bar, bending said projections and assembling said elements so that the projections will be adjacent to each other and will form between them a space in which a conductor may be positioned.

In witness whereof, we have hereunto subscribed our names in the presence of two witnesses.

HENRY L. ZABRISKIE.
GUSTAVE C. MARX.

Witnesses:
C. H. MORRELL,
E. J. DE GROOT.